Aug. 6, 1968 M. J. RAND 3,396,052
METHOD FOR COATING SEMICONDUCTOR DEVICES WITH SILICON OXIDE
Filed July 14, 1965
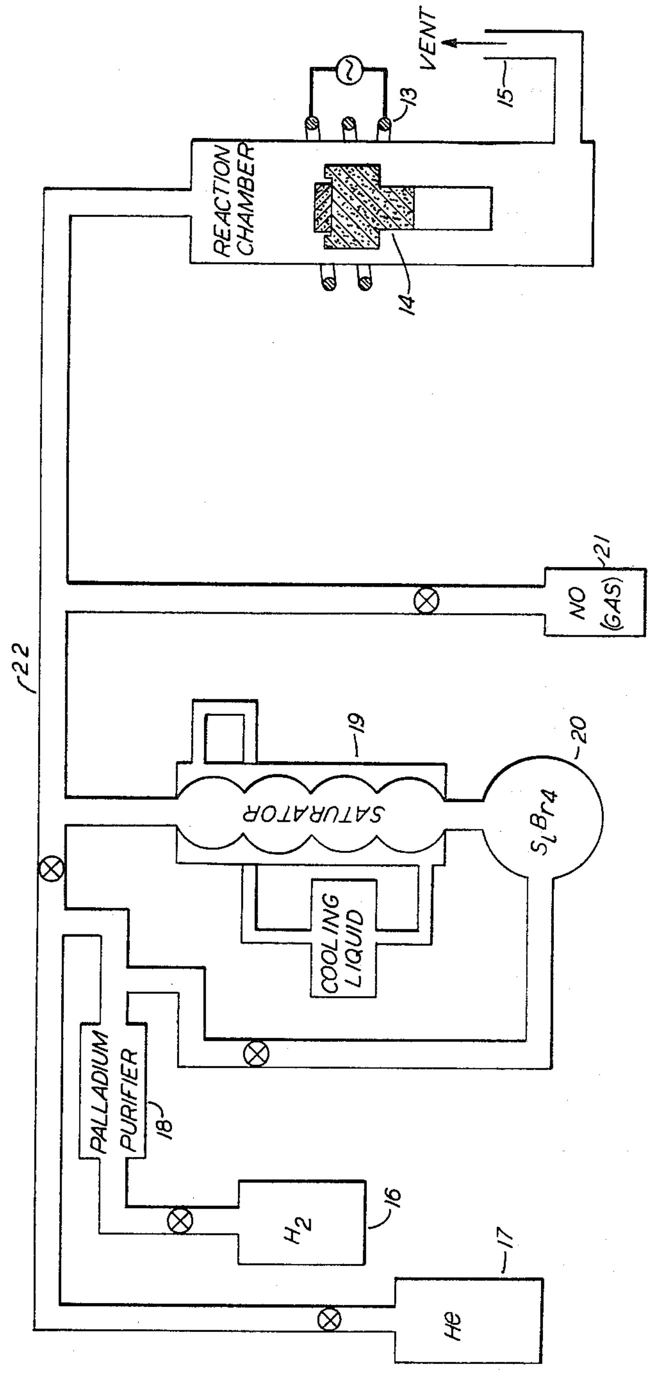
INVENTOR
M. J. RAND
BY H W Lockhart
ATTORNEY United States Patent Office 3,396,052

Patented Aug. 6, 1968

3,396,052

METHOD FOR COATING SEMICONDUCTOR DEVICES WITH SILICON OXIDE

Myron J. Rand, Bethlehem, Pa., assignor to Bell Telephone Laboratories, Incorporated, New York, N.Y., a corporation of New York Filed July 14, 1965, Ser. No. 471,837
9 Claims. (Cl. 117—201)

ABSTRACT OF THE DISCLOSURE

This invention involves the formation of oxide films on semiconductor substrates by a chemical reaction of various volatile metal compounds in a gas phase in the presence of nitric acid and hydrogen.

This invention relates to the formation of oxide films on substrates and particularly to the formation of such films on semiconductor bodies.

An important step in the fabrication of many solid state electrical devices is the formation of a film of oxide on a surface, or surfaces, of the solid state material. These films, which may be characterized as glassy, are used primarily for masking portions of surfaces during fabrication and for the electrical stabilization of the complete device. Dielectric oxide films are useful also in a wide variety of devices wherein they form part of capacitive structures. To this end such oxide films desirably are substantially nonporous, uniform in dimension and structure, and of relatively high purity. Also it is advantageous to deposit such films at as low temperatures and at as rapid rates as possible.

Accordingly, an object of this invention is to produce oxide films on substrates at lower temperatures and at faster deposition rates than has been possible heretofore.

A particular object of the invention is to form silica films on semiconductor substrates at lower temperatures and higher rates.

An ancillary object is to form oxide films not only by an improved method, but also to produce films of an improved quality and adherence.

Broadly, the art presently includes several techniques for forming oxide films on substrates. In one category are the techniques which oxidize surface portions of the substrate material itself to form the surface film. In the semiconductor art this technique has been practical thus far only for silicon.

The other broad category involves the projection of material from a source to deposit the film upon the substrate surface. Such deposition techniques include processes of evaporation, sputtering, and the deposition of products of a chemical reaction occurring in the vapor phase above the surface.

This invention is directed primarily to a technique of the latter category using the reaction of a halide or other volatile compound, such as hydrides and oxides, of the element of which the oxide is formed. In particular, the reaction occurs in the presence of nitric oxide to provide an enhanced oxide deposition rate at the usual decomposition temperatures or a substantial deposition rate at a lower temperature than has heretofore been practical. In one particular embodiment of the invention a coating of silica or silicon oxide is produced by maintaining the substrate surface at an elevated temperature in a suitable reaction chamber through which is provided a flow of a mixture of hydrogen gas, a small amount of a silicon halide, such as silicon tetrabromide, and a small concentration of nitric oxide gas.

In another aspect of the invention the deposition process is commenced by first producing a flow of the reactive materials in the reaction chamber before raising the temperature. After such flow has been stabilized the temperature then is raised to the reactive range. This procedure substantially eliminates etching of the surface of the substrate.

A better understanding of the invention and its other objects and features may be had from the following more detailed description taken in conjunction with the drawing which depicts in schematic form one arrangement of apparatus for practicing the invention.

Referring to the drawing, the substrate material to be oxide coated is mounted within a reaction chamber 11 having suitable connections for admitting and exhausting the required atmospheres. The substrate, in this case a germanium wafer 12 is mounted on a molybdenum pedestal 14 which is heated by means of a radio-frequency coil 13 surrounding the chamber. Shown diagrammatically are a hydrogen gas, and an inert flushing gas source 17, typically helium. A saturator 19 is provided through which the carrier gas is passed and in which it picks up a concentration of silicon tetrabromide from the liquid reservoir 20. The concentration level of this vapor is controlled by varying the temperature of the saturator. There is also provision for adding nitric oxide gas from the source 21 to the supply main 22 going to the reaction chamber 11. Typically, the silicon halide compound is furnished at a concentration of from about 0.1 percent to 1 percent and the nitric oxide at a concentration of from 0.2 percent to 10.0 percent. For these values a suitable temperature range for the substrate surface is between 750 and 950 degrees centigrade. Under these conditions high quality silicon oxide films are formed not only on germanium as in this specific example, but likewise upon silicon and also other substrates. Flow through the apparatus is produced by the slight line pressure of the gas supply and means for exhausting the reaction products from the reaction chamber is provided by way of the vent 15.

In carrying out the process in accordance with this invention, it has been found advantageous to start the flow of the materials through the system including the reaction chamber 11 while the substrate is still substantially at room temperature. As a consequence of this procedure the effects of etching by the reactive materials upon the substrate surface in the period before the oxide coating begins to form is minimized. Although the exact reasons for this improvement are not completely understood, it is believed that by the foregoing technique some protective coating is formed before the material reaches the higher temperatures at which etching of the surface occurs more readily and rapidly.

In another specific example in which the total gas flow was at the rate of four liters per minute and included a concentration of 1 percent nitric oxide and 0.1 percent silicon tetrabromide the growth rate of silicon oxide in Angstrom units per minute at various temperatures is as follows:

| Temp., ° C.: | Growth rate |
|---|---|
| 800 | 92 |
| 825 | 165 |
| 850 | 265 |
| 900 | 420 |
| 950 | 450 |

Another particularly useful silicon compound in addition to silicon tetrabromide is silicon tetrachloride. Generally the concentration range for this compound is similar to that recited for the tetrabromide, although the useful temperature range is somewhat higher. Moreover the reaction process described herein for depositing particularly silicon oxide films is useful for other elements, generally of the refractory group. In particular, improved oxide films may be deposited by the nitric oxide process using compounds of silicon, aluminum, titanium, vanadium, tantalum, niobium, zirconium, thorium, and beryllium in a mixture including a reducing gas, such as hydrogen, and nitric oxide as the oxidizer. In general, it will be recognized that the foregoing recited elements, which for the purposes of this disclosure are defined as refractory, have vaporizable compounds, particularly halides, at the temperatures of interest in connection with the process disclosed herein, and can form glassy oxide films. Moreover, certain of the elements have suitable hydrides such as in the case of silicon, the silanes, which can be used.

The technique is particularly advantageous in planar semiconductor device technology. Typically. in the fabrication of such devices a layer of semiconductor material is formed epitaxially on the original semiconductor body by a hydrogen reduction of a halide of the semiconductor material, for example, germanium or silicon tetrachloride. At the conclusion of this step, in accordance with this invention, it is necessary only to adjust the concentrations and add nitric oxide to accomplish the deposition of silicon oxide typically in order to continue the fabrication of the device. The advantages of this procedure from the standpoint of avoiding contamination and maintaining a stable processing condition are self-evident.

Although the process, in accordance with this invention, has been described particularly in connection with film formation on semiconductor bodies, it is also usable on other solid substrates including metals and ceramics. Moreover the films formed particularly on semiconductor substrates have been found to have improved adherence, as well as providing for improved adherence of mask coatings applied thereto in connection with photolithographic processing. Furthermore there appears to be less erosion by etching of the substrate using this nitric oxide process than occurs with other techniques.

In addition to the formation of single element oxides, mixed oxides, including two or more of the abovementioned elements may be deposited from mixed systems. In particular, for example, halides of both aluminum and silicon may be used to produce a mixed aluminum-silicon oxide. Also, as is known in the art, oxide films containing significant impurities, donors or acceptors, can be produced by adding suitable compounds to the source material.

Accordingly, although the invention has been disclosed in terms of certain specific embodiments, it is to be understood that other arrangements may be devised by those skilled in the art which likewise fall within the scope and spirit of the invention. All percent concentrations herein are by volume.

What is claimed is:

1. The process of forming a film of an oxide of a refractory element on a substrate by heating said substrate at an elevated temperature below its melting point in an atmosphere including hydrogen, a quantity of nitric oxide at a concentration of from 0.2 to about ten percent, and the vapor of a compound of said refractory element.

2. The process in accordance with claim 1 in which said refractory elements are selected from the group consisting of silicon, aluminum, titainum, vanadium, tantalum, niobium, zirconium, beryllium and thorium.

3. A process in accordance with claim 2 in which the compounds are selected from the group consisting of chlorides and bromides.

4. The process in accordance with claim 2 in which said atmosphere includes the compounds of a plurality of refractory elements and said oxide film includes a mixture of the oxides of said elements.

5. The process in accordance with claim 4 in which the compounds are halides.

6. The process of forming a silicon oxide film on a surface of a semiconductor body, comprising the step of heating said body at an elevated temperature of more than about 700 degrees centigrade, but below the melting point of said semiconductor body in the presence of a mixture including nitric oxide at a concentration from 0.2 percent to about ten percent, hydrogen and a silicon halide, whereby a film of silicon oxide is deposited on said semiconductor surface.

7. The process in accordance with claim 6 in which the silicon halide is selected from the group consisting of the chlorides and bromides of silicon.

8. The process in accordance with claim 6 in which body is placed first in the presence of said mixture and then is heated.

9. The process of forming an aluminum oxide film on a surface of a substrate by heating the substrate at an elevated temperature below the melting point of the substrate in an atmosphere including hydrogen, nitric oxide at a concentration from 0.2 percent to about 10 percent, and aluminum halide.

References Cited

UNITED STATES PATENTS

| | | | |
|---|---|---|---|
| 2,930,722 | 3/1960 | Ligenza | 117—201 X |
| 3,231,422 | 1/1966 | Emeis | 17—201 X |
| 3,258,359 | 6/1966 | Hugle | 148—174 |
| 3,297,500 | 1/1967 | Drake et al. | 117—106 X |
| 3,331,716 | 7/1967 | Bloem et al. | 117—201 X |

OTHER REFERENCES

Mason et al.: "Corrosion," vol. 13, December 1957, pp. 55–61.

WILLIAM L. JARVIS, *Primary Examiner.*